United States Patent [19]

Paton et al.

[11] 4,310,737

[45] Jan. 12, 1982

[54] PIPE RESISTANCE BUTT WELDING APPARATUS

[76] Inventors: Boris E. Paton, ulitsa Chkalova, 41-a, kv. 26; Vladimir K. Lebedev, ulitsa Engelsa, 25, kv. 12; Sergei I. Kuchuk-Yatsenko, ulitsa Filatova, 1/22, kv. 47; Vasily A. Sakharnov, ulitsa Solomenskaya 41, kv. 93; Boris A. Galyan, ulitsa Lenina, 88/92, kv. 110; Alexandr P. Miroshnichenko, ulitsa Chumaka, 4, kv. 58, all of Kiev, U.S.S.R.

[21] Appl. No.: 149,735

[22] Filed: May 14, 1980

[30] Foreign Application Priority Data

Aug. 6, 1979 [SU] U.S.S.R. ............... 2789202

[51] Int. Cl.³ ........................... B23K 11/00
[52] U.S. Cl. ................. 219/59.1; 219/61.1; 219/67; 219/160; 219/161
[58] Field of Search ............... 219/59.1, 61.1, 67, 219/97, 160, 161

[56] References Cited

U.S. PATENT DOCUMENTS 3,684,856  8/1972  Lifshits ............... 219/97
4,012,619  3/1977  Lifshits ............... 219/61.1

Primary Examiner—Elliot A. Goldberg
Attorney, Agent, or Firm—Burton L. Lilling

[57] ABSTRACT

A pipe resistance butt welding apparatus comprises a movable clamp and a fixed clamp to locate the pipes to be welded. Current-feeding shoes contact the ends of the pipes to be welded together. A device is provided for axially moving the movable clamp in fusing and upsetting the pipes. Both clamps and the device are mounted on an elongated supporting member. The shoes are carried by beams oriented along the supporting member and having bevels acted upon by drive rollers, whose axes are directed across the supporting member. The invention is useful for welding large diameter pipes.

7 Claims, 2 Drawing Figures

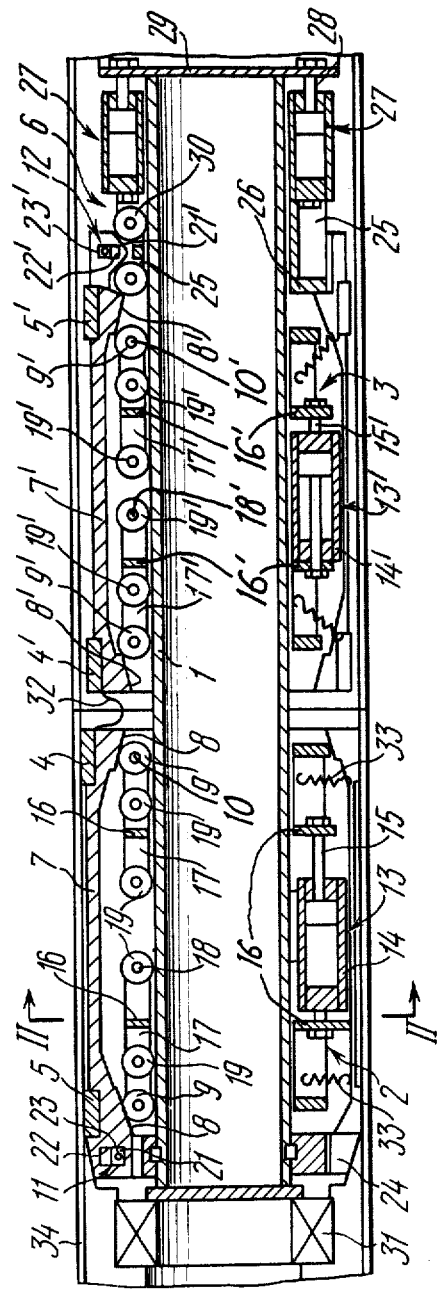
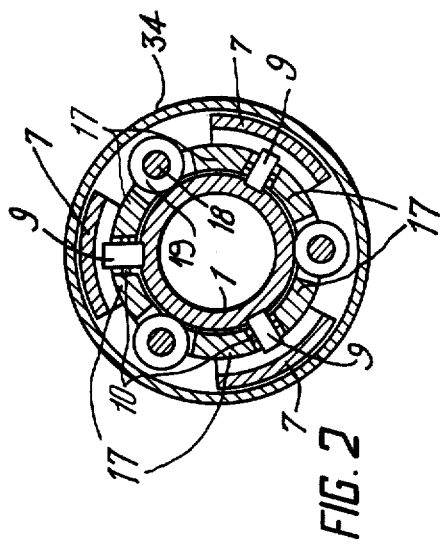

PIPE RESISTANCE BUTT WELDING APPARATUS

BACKGROUND OF THE INVENTION

1. Field of the Invention

The present invention relates to apparatus for resistance butt welding of pipes in constructing petroleum and gas trunk pipelines. More specifically, the invention is concerned with the construction of the apparatus placed inside pipes for resistance butt welding thereof.

Resistance butt welding apparatus find ever increasing application, especially for welding small (about 500-mm) and medium (up to 900-mm) diameter pipes of trunk pipelines.

However, employing resistance butt welding apparatus for welding large (over 900-mm) diameter pipes involves problems in attaining an accurate alignment of the pipes to be welded, which stem from the fact that larger-diameter pipes are heavier and tolerances for both their inside diameter and the taper of their inside surface are greater.

It is common knowledge that to ensure a reliable alignment of the pipes to be weld-joined, an apparatus must, firstly, offer an adequate stiffness and, secondly, effect a reliable clamping of the ends of the pipes. To meet the latter requirement, the apparatus should grip a pipe end over such a length (base) that the weight of the free end of the pipe would not affect the accuracy of aligning the pipes.

2. Description of the Prior Art

The most extensive application for welding large diameter pipes has been found by resistance butt welding apparatus with self-aligning conical clamps as described in USSR Inventor's Certificate No. 351,423 (1970). With such clamps, however, the pipes, i.e. their ends to be welded together, must meet more stringent requirements to ensure a reliable alignment.

Employing other prior art resistance butt welding apparatus, such as that disclosed in USSR Inventor's Certificate No. 292,743, gives rise to adverse effects in that the working fluid pressure is used only to actuate clamps by hydraulic cylinder rods, while the response is taken up by fixed bodies of the cylinders. There is known a pipe resistance butt welding apparatus (USSR Inventor's Certificate No. 326,031, 1970) which comprises an elongated supporting member carrying a fixed expanding clamp and a movable expanding clamp, serving to locate by current-feeding and clamping shoes the pipes to be welded, and a device for drawing the pipes together in fusion and upsetting. The expanding clamps have the form of vane-type rotary actuators with turnable vanes alternately rigidly connected to two turnable shaped rings which act through rollers on the clamping and current-feeding shoes.

Although in this apparatus the clamping and current-feeding shoes of each expanding clamp are spaced at a considerable distance from each other and provide for clamping the pipe end over a great length (base), the apparatus has nevertheless some disadvantages which cause difficulties in welding large-diameter pipes.

First of all, the above rotary actuator by itself makes the apparatus more complex and heavier. In addition, an inside surface taper tolerable in large diameter pipes causes the shoes to bear against the pipe by only a part of their surface, which impairs the dependability of clamping the pipe end and eventually lowers the weld quality. Furthermore, the rollers contacting the shaped rings are acted upon by much greater concentrated loads at points disposed on the same vertical with the point of application of the maximum force to a shoe, which causes the rollers to fail.

SUMMARY OF THE INVENTION

An object of the present invention is to provide a pipe resistance butt welding apparatus, placed inside the pipes to be weldjoined, which ensures a welding of large (over 900-mm) diameter pipes.

Another object of the invention is to provide a pipe resistance butt welding apparatus which features a simpler construction as against the prior art.

Still another object of the invention is to provide a pipe resistance butt welding apparatus which ensures a reliable clamping and alignment of the pipes to be welded.

More specifically, the object of the present invention is to provide a pipe resistance butt welding apparatus which ensures a reliable clamping and alignment of the pipes to be welded, attained by applying to the clamping shoes a uniform load along the generatrix of the inside surface of the pipe ends being clamped.

The above-mentioned and other objects are attained by a pipe resistance butt welding apparatus comprising an elongated supporting member which carries a fixed expanding roller clamp and a movable expanding roller clamp, serving to locate the pipes to be welded. Current feeding and clamping shoes and a device for axially moving the movable expanding clamp in fusion and upsetting are also provided. According to the invention, each of the expanding roller clamps is provided with at least three beams oriented along the axis of the supporting member and carrying on the outside of their ends the current-carrying and clamping shoes. On the inside of each beam there are bevels acted upon by rollers of the respective expanding clamp, the rollers of the expanding clamps being oriented by their axes across the axis of the supporting member. Each beam of the fixed expanding roller clamp is pivotally coupled at one end with one end of the supporting member for radial-translatory movement with respect to the axis of the pipes to be welded; and, each beam of the movable expanding roller clamp is pivotally coupled at one end with the supporting member for both a radial-translatory and an axial movement and is coupled with the device for axially moving the movable expanding roller clamp in fusion and upsetting of the pipes, mounted on the other end of the supporting member.

The location of the two shoes at both ends of each beam as well as a pivoted coupling of one end of each beam with the supporting member provide for uniformly loading each shoe with a full bearing thereof against the inside surface of the pipe end being clamped. This ensures a reliable clamping and alignment of large diameter pipes with large tolerances for both the inside diameter and the taper of the inside surface.

The movable expanding clamp is preferably coupled with the supporting member by means of a supporting disk which should be fixed on an end of the supporting member; each beam of both the fixed and the movable expanding clamp should be in this case linked with the supporting disk and with the device for axially moving the movable expanding clamp respectively by means of a hinged joint comprising a slide received in, and adapted to slide along, a guide slot, provided at the end of the beam, and pivotally coupled with the supporting disk or with the device for axially moving the movable expanding clamp in fusion and upsetting respectively.

BRIEF DESCRIPTION OF THE DRAWINGS

The invention will now be explained by a detailed description of the pipe resistance butt welding apparatus with reference to the accompanying drawings, wherein similar parts are designated by similar reference numerals and wherein:

FIG. 1 is a longitudinal, sectional view of the pipe resistance butt welding apparatus of the invention; and FIG. 2 is a sectional view taken along the line II—II in FIG. 1 and showing the arrangement of rollers on the supporting member and coupling of a ring member with an actuating means.

DETAILED DESCRIPTION OF THE INVENTION

A pipe resistance butt welding apparatus comprises an elongated supporting member 1 (FIG. 1) carrying a fixed expanding roller clamp 2 and a movable expanding roller clamp 3, which clamps include respectively current-feeding shoes 4 and 4' and clamping shoes 5 and 5', serving to locate the pipes being welded on the apparatus in the course of welding.

The supporting member mounts also a device 6 for axially moving the movable expanding clamp 3.

According to the invention, each of the expanding roller clamps 2 and 3 is provided with at least three beams 7 and 7' (FIG. 2) respectively, oriented along (FIG. 1) the axis of the pipes to be welded.

The ends of the beams 7 and 7' carry on their outside the current-feeding shoes 4 and 4' and the clamping shoes 5 and 5'. The inside of the ends of the beams 7 and 7' has bevels 8 and 8' acted upon by rollers 9 and 9' of respective expanding clamps 2 and 3. These rollers are mounted on axles 10 and 10' oriented across the axis of the supporting member 1. Each beam 7 of the fixed expanding roller clamp 2 has one end coupled through a hinged joint 11 with one end of the supporting member 1. The hinged joint 11 allows the beam 7 of the fixed expanding clamp 2 to effect a radial-translatory movement both towards and away from the surface of the end of the pipe to be welded.

Each beam 7' of the movable expanding roller clamp 3 has one end coupled through a hinged joint 12 with the supporting member 1 and with the device 6 for axially moving the movable expanding roller clamp 3.

The fixed expanding clamp 2 and the movable expanding clamp 3 each have a hydraulic cylinder 13 and 13' respectively. Ring members 16 and 16' are rigidly attached to rods 15 and 15' and bodies 14 and 14' of the hydraulic cylinders 13 and 13'; at least three carriages 17 and 17' (FIG. 2) are rigidly coupled to each ring member 16 and 16'. The carriages 17 and 17' have working rollers 9 and 9' and supporting rollers 19 and 19' mounted on axles 18 and 18' and encompass the supporting member 1 so that their rollers 9 and 9' and 19 and 19' contact the surface of the supporting member.

Each hinged joint 11 comprises a slide 21 and a guide slot 22 provided at an end of the beam 7. The slide 21 is pivotally mounted on a pivot pin 23 fixedly secured in a slit in a supporting disk 24 and disposed crosswise to the axis of the supporting member 1. The supporting disk 24 is fixedly mounted on an end of the supporting member 1.

Each pivotal assembly 12 comprises a slide 21' and a guide slot 22' provided at an end (the right-hand one in the drawing) of the beam 7'. The slide 21' is mounted on a pivot pin 23' fixedly secured in a crosswise relation to the axis of the supporting member 1 on one of the carriages 25 which have a device 6 for axially moving the movable expanding clamp 3.

At least three carriages 25 are rigidly attached to one side of a ring member 26 whose other side is rigidly coupled to at least three hydraulic cylinders 27. Rods 28 of the hydraulic cylinders 27 are rigidly coupled to a supporting disk 29 fixed at an end of the supporting member 1. The carriages 25 have supporting rollers 30 which contact the surface of the supporting member 1 to ensure thereby a pivotal coupling of the end of the beam 7' with the supporting member 1.

A welding transformer 31 is disposed coaxially with the supporting member 1. The leads of the secondary winding of the transformer are connected (not shown) to the current-feeding shoes 4 and 4'. The current-feeding shoes 4 of the fixed expanding clamp 2 are connected by a flexible jumper 32 with the current-feeding shoes 4' of the movable expanding clamp 3.

Compression springs 33 coupling the beams 7 and 7' with the carriages 17 and 17' are provided to return the shoes 4 and 4' and 5 and 5' to the initial position.

The apparatus has also a pump station and a drive with selfaligning and drive rollers to move the apparatus (the pump station and the drive are not shown in the drawings).

The above-described apparatus operates as follows.

The apparatus is introduced into a pipe 34 (FIG. 1) to be welded and moved inwardly of the pipe until the end of the pipe 34 is at the midpoint between the shoes 4 and 4'. Working fluid under pressure is then admitted into the hydraulic cylinder 13 of the fixed expanding clamp 2. The rod 15 of the hydraulic cylinder 13 moves in one direction (to the right in the drawing), while the body 14 of the hydraulic cylinder 13 moves in the opposite direction (to the left in the drawing). Moving in opposite directions, the ring members 16 with the carriages 17 act by the working rollers 9 on the bevels 8 of the beams 7; this causes the beams 7 to move radially and to press the shoes 4 and 5 against the inside surface of the end of the pipe 34 to be welded. Since the beam 7 is free to both effect a radial-translatory movement and rock in an axial plane of the apparatus, the shoes 4 and 5 mounted on the beam follow the inside surface of the end of the pipe 34 and hence bear against the surface tightly and with a uniform load. The pipe 34 is thus clamped by the fixed expanding clamp 2.

A second pipe 35 to be welded is then put onto the free end of the welding apparatus until the end of the pipe thrusts against the end of the first pipe 34.

Next, working fluid is admitted into the hydraulic cylinder 13' of the movable expanding clamp 3, and the clamp 3 clamps the second pipe 35 to be welded in the same manner as the fixed expanding clamp 2 has clamped the first pipe 34.

Current is then fed to the welding transformer 31, and working fluid is admitted into the hydraulic cylinders 27 of the device 6 for axially moving the movable expanding clamp 3. The bodies of the hydraulic cylinders 27 and hence also the carriages 25 coupled thereto move towards the movable expanding clamp 3 (to the left in the drawing) and push the clamp 3 jointly with the pipe 35 clamped thereon towards the butt of the pipes to be weld-joined.

The effect of the current fuses and heats the pipe ends. After these are sufficiently heated, the upsetting is carried out, which is provided by a further movement of the bodies of the hydraulic cylinders 27 of the device 6 for axially moving the movable expanding clamp 3.

After the welding has been completed, working fluid under pressure is admitted into the spaces of the hydraulic cylinders 13 and 13' and 27, opposite to their working spaces. The rods 15 and 15' and 28 of the hydraulic cylinders 13 and 13' and 27 retract into their bodies, drawing together the ring members 16 and 16', and with them the carriages, so that the working rollers 9 and 9' are forced out from under the bevels 8, 8' of the beams 7 and 7' and hence release the beams, and the springs 33 force the shoes 4 and 5 and 4' and 5' away from the inside surface of the ends of the pipes having been welded together.

While particular embodiments of the invention have been shown and described, various modification thereof will be apparent to those skilled in the art, and therefore it is not intended that the invention be limited to the disclosed embodiments thereof, and departures may be made therefrom within the spirit and scope of the invention as defined in the following claims.

What is claimed is:

1. A pipe resistance butt welding apparatus comprising:
    an elongated supporting member;
    a plurality of clamping shoes and current-feeding shoes, radially movable towards and away from the pipes to be welded to locate the pipes before fusion and to feed the welding voltage to the welding zone respectively;
    a fixed internal expanding clamp to locate the pipes to be welded, mounted on said supporting member and comprising at least three lengthwise beams each pivotally coupled at one end with one end of said supporting member for radial-translatory movement with respect to the axis of said supporting member and carrying on the outside of its ends a clamping shoe and a current-feeding shoe of said plurality of clamping shoes and current-feeding shoes and on its inside having bevels, and drive rollers being in a rolling-contact relation with said supporting member to move along the supporting member to act upon the bevels of said at least three beams;
    a drive of said rollers to accomplish said function in said fixed expanding clamp;
    a movable expanding clamp to locate the pipes being welded, mounted beside said fixed expanding clamp on said supporting member and comprising carriages movable along said supporting member, at least three lengthwise beams each pivotally coupled at one end with said carriages for radial-translatory movement with respect to the axis of said supporting member and carrying on the outside of its ends a clamping shoe and a current-feeding shoe of said plurality of clamping shoes and current-feeding shoes and on its inside having bevels, and drive rollers being in a rolling-contact relation with said supporting member to move along the supporting member to act upon the bevels to said at least three beams;
    a drive of said rollers to accomplish said function in said movable expanding clamp; and
    a device for axially moving said movable expanding clamp in fusion and upsetting, mounted on said supporting member beside said movable expanding clamp and coupled with said movable expanding clamp.

2. An apparatus as defined in claim 1, further comprising a supporting disk installed on said supporting member and wherein each said beam of said movable expanding clamp has at one end a guide slot, and said supporting disk and said carriages comprise respectively at least three slides each pivotally coupled therewith and inserted into and sliding along the guide slot of the respective beam.

3. A pipe resistance butt welding apparatus comprising:
    an elongated supporting member;
    a plurality of current-feeding shoes connected to a voltage source;
    a plurality of clamping shoes; a fixed expanding roller clamp positioned on a first end of said elongated supporting member and comprising at least three beams oriented along the axis of a first pipe to be welded, respective first clamping shoes being supported on an outside surface of a first end of each beam and respective first current-feeding shoes being supported on an outside surface of a second end of each beam, inside surfaces of said ends of each beam having bevels, and said first end of each beam being coupled to said supporting member; a hydraulic cylinder; ring members attached to said hydraulic cylinder; and at least three carriages, each carriage being coupled to each ring member, working rollers of each carriage contacting and being movable along the surface of said supporting member and engageable with said bevels to press said respective first current-feeding shoes and said respective first clamping shoes against an inside surface of said first pipe, and supporting rollers contacting and being movable along the surface of said supporting member;
    a movable expanding roller clamp positioned on a second end of said elongated supporting member and comprising at least three beams oriented along the axis of a second pipe to be welded, respective second clamping shoes being supported on an outside surface of a first end of each beam and respective second current-feeding shoes being supported on an outside surface of a second end of each beam, inside surfaces of said ends of each beam having bevels, and said first end of each beam being coupled to said supporting member; a hydraulic cylinder; ring members attached to said hydraulic cylinders; and at least three carriages, each carriage being coupled to each ring member, working rollers of each carriage contacting and being movable along the surface of said supporting member and engageable with said bevels to press said respective second current-feeding shoes and said respective second clamping shoes against an inside surface of said second pipe, and supporting rollers contacting and being movable along the surface of said supporting member; and means for axially moving said movable expanding clamp mounted on said elongated supporting member and being operably associated with said movable expanding clamp.

4. A pipe resistance butt welding apparatus according to claim 3, further comprising hinged joints connecting said fixed expanding roller clamp and said elongated supporting member together, wherein each hinged joint comprises a supporting disk mounted on said supporting member; a pivot pin secured in a slit in said supporting disk and disposed crosswise to the axis of said supporting member; and a slide pivotally mounted on said pivot pin and movable along a guide slot provided in said first end of a respective beam of said fixed expanding roller clamp.

5. A pipe resistance butt welding apparatus according to claim 3, wherein said means for axially moving said movable expanding roller clamp comprises a supporting disk fixed on said supporting member; at least three hydraulic cylinders, rods of each hydraulic cylinder being coupled to said supporting disk; a ring member coupled to each hydraulic cylinder; and at least three carriages coupled to said ring member, supporting rollers of each carriage contacting and being movable along the surface of the elongated supporting member, and each carriage being coupled to said first end of a respective beam of said movable expanding roller clamp.

6. A pipe resistance butt welding apparatus according to claim 5, further comprising pivotal assemblies connecting said movable expanding roller clamp to said elongated supporting member and said means for axially moving said movable expanding roller clamp, wherein each pivotal assembly comprises a pivot pin secured on a respective carriage of said means for axially moving said movable expanding roller clamp and in a crosswise relation to the axis of the supporting member; and a slide mounted on said pivot pin and movable along a guide slot provided in said first end of a respective beam of said movable expanding roller clamp.

7. A pipe resistance butt welding apparatus according to claim 3, further comprising compression springs to return all of said beams and carriages to an initial position.

* * * * *